United States Patent
Kelley

(10) Patent No.: US 6,174,525 B1
(45) Date of Patent: Jan. 16, 2001

(54) RECREATIONAL FISHING LURE

(76) Inventor: Donald W. Kelley, 608 N. Palestine, Athens, TX (US) 75751

(*) Notice: Under 35 U.S.C. 154(b), the term of this patent shall be extended for 0 days.

(21) Appl. No.: 09/413,046

(22) Filed: Oct. 6, 1999

Related U.S. Application Data

(63) Continuation-in-part of application No. 09/067,543, filed on Apr. 27, 1998, now abandoned.
(60) Provisional application No. 60/044,335, filed on Apr. 28, 1997.

(51) Int. Cl.[7] .......................... A01K 85/01; A01N 25/04; B01J 13/00; C08J 3/05
(52) U.S. Cl. ..................... 424/84; 43/42; 106/205.01; 516/104; 516/107; 524/55; 524/916
(58) Field of Search ....................... 516/104, 107; 426/1; 43/42; 524/55, 916; 424/84; 106/205.01

(56) References Cited

U.S. PATENT DOCUMENTS

| | | | |
|---|---|---|---|
| 2,827,376 | * 3/1958 | Breuer | 426/1 |
| 3,767,787 | * 10/1973 | Segal | 516/107 X |
| 3,779,968 | * 12/1973 | Argabright et al. | 524/916 X |
| 3,875,302 | 4/1975 | Inoue | 426/524 |
| 4,375,481 | 3/1983 | Kuwabara et al. | 426/93 |
| 4,664,857 | 5/1987 | Nambu | 264/28 |
| 4,676,976 | * 6/1987 | Toba et al. | 516/107 X |
| 5,089,277 | 2/1992 | Prochnow | 426/805 |
| 5,393,537 | * 2/1995 | Rawlins | 426/1 |
| 5,506,290 | 4/1996 | Shapero | 524/55 |

* cited by examiner

Primary Examiner—Richard D. Lovering
(74) Attorney, Agent, or Firm—Jacqueline S. Larson; Donald W. Erickson

(57) ABSTRACT

Fish lures and compositions and processes for making fish lures are described. The fish lures are soft and biodegradable, and they release fish attractant efficiently. Compositions for making the fishing lures comprise at least one water-soluble long-chain polyhydroxy polymer and, optionally, a water-soluble polymeric gum and/or a hydrogen-bonding accelerator. The lures may be cured after molding by subjecting the lure to freezing temperatures for various intervals of time.

18 Claims, No Drawings

RECREATIONAL FISHING LURE

This application is a continuation-in-part of U.S. Application Ser. No. 09/067,543, filed Apr. 27, 1998 and now abandoned, which claims the benefit of U.S. Provisional Application Ser. No. 60/044,335, filed Apr. 28, 1997.

FIELD OF THE INVENTION

The present invention relates to polymeric biodegradable fish lures, compositions therefor, and processes for manufacturing the lures and the compositions.

BACKGROUND OF THE INVENTION

Several compositions are known to be recommended for artificial fish lures. The preferred composition and the standard for the recreation fishing industry are the polyvinyl chloride plastisols (PVC). PVC is ideally suited for formulating and molding soft lures. However, PVC has two major drawbacks: i) it does not biodegrade in the environment, nor is it digestible, and ii) it does not release fish attractants efficiently.

PVC is persistent in the environment and is not digestible by fish or animals. Fish are known to have completely blocked their digestive systems by consuming PVC lures, resulting in the death of the fish. PVC plastisol lures are comprised of polyvinyl chloride, hydrocarbon plasticizers, oil extenders and stabilizers. These compounds are not water-soluble and will persist in the lakes and rivers year after year. It is obvious that a biodegradable lure would be advantageous to the environment as well as to the fish that take the lure but are not caught or those that find and eat the lost lures.

PVC lures do not release active chemicals (attractants) very well, and generally from the surface of the lure only. Active chemicals present inside of a PVC lure are not released at all or at best are released at a very slow and ineffective rate from fish lures. Clearly a more efficient release of chemical attractants would be desirable.

Compositions have been described that could meet the biodegradable and release of attractant issues, but they do not address the necessary properties required of a soft recreational fishing lure. Additionally, they have disadvantages even within the technologies described.

U.S. Pat. No. 4,664,857 (Nambu) describes a method of making a hydrogel utilizing polyvinyl alcohol (PVA), carrageenan, xanthan, guar gum. The patent states that fish-luring agents may be used to formulate fish baits with this invention. However, Nambu teaches that vacuum dehydration while a molded object remains frozen (that is, freeze drying) is required to produce a hydrogel from PVA that is strong, elastic and water-resistant. A rehydration process is also called for. This vacuum dehydration and later rehydration is a time-consuming and costly process.

U.S. Pat. No. 3,875,302 (Inoue) describes a hydrogel made from PVA. It is stated that an artificial bait can be prepared. Inoue's teaching requires a freezing period of a minimum of two hours and up to fifty hours. This process is time- and cost-consuming. Inoue's technology cannot process PVA with a degree of polymerization above 2000, putting a significant limitation on developing lures that are as tough as or tougher than PVC lures.

U.S. Pat. No. 4,375,481 (Kuwabara) describes a product with an inner and an outer layer, which is targeted primarily as a human food, but a claim is made that the process can produce a fish bait. This process utilizes gums, starches, proteins, etc., and metal ions to effect chemical crosslinking. This gel form lacks the coadhesive strength to remain empaled on a fishhook while casting, trolling, and the like actions used in fishing. This technology also does not allow for a satisfactory combination of strength, elasticity and flexibility required for a satisfactory fishing lure. If the gel is made strong, the chemical bonds make the gel hard and stiff; if made soft and flexible, the gel is not strong enough. By nature of the crosslinking in the Kuwabara patent, elasticity is reduced.

SUMMARY OF THE INVENTION

This invention is directed to molded fish lures, compositions therefor, and processes for manufacturing the lures and the compositions. The fish lures of the invention are soft and they exhibit superior durability, tensile strength, flexibility, elasticity, cohesive strength, aesthetic appeal, and low cost. Importantly, they are biodegradable and can release fish attractants efficiently. The artificial lures of the invention may take the form and shape of, for example, worms, nightcrawlers, grubs, shad, crawfish, salmon eggs, mealworms, and the like. By "soft" is meant that the lure has a Shore 00 durometer reading of from about 0 to about 50 on an ASTM D2240 OO type scale. Fish lures having a Shore durometer reading within this range also exhibit many of the other necessary requirements of an acceptable lure, including flexibility, elasticity, and aesthetic appeal (as it relates to feel).

Compositions for making soft, water-soluble, artificial fishing lures of the present invention comprise, in one embodiment, a biodegradable long-chain polymer. In a second embodiment, the soft, water-soluble fishing lures of the invention comprise a biodegradable blend of a long-chain polymer and a polymeric gum. The components may be used alone or they may be used in combinations of two or more. The polymers and gums used in the present invention are water-soluble and biodegradable. In a presently preferred embodiment, the compositions further include an aromatic hydroxyl compound. This compound acts as a hydrogen-bonding accelerator. The compositions of the invention may additionally and optionally include other additives such as, for example, plasticizers, fish attractants, water, coloring agents and glitter, and the like.

The present invention is further directed to a process for the manufacture of a fish lure, the process comprising obtaining an aqueous solution of a biodegradable long-chain polymer; adding to the solution a biodegradable gum and, optionally, a hydrogen-bonding accelerator to form a mixture of the polymer, the gum and, optionally, the accelerator; heating and stirring the mixture until the gum is hydrated; shaping the mixture into the form of a fish lure; and subjecting the formed fish lure to freezing temperatures. The formed fish lure may be subjected to at least one freeze/thaw cycle.

DETAILED DESCRIPTION OF THE INVENTION

The term "long-chain polymer", as used herein and in the appended claims, refers to network and linear polyhydroxy polymers with a molecular weight of not less than 195,000 and a degree of polymerization (DP) above 2000. In the practice of the present invention, the biodegradable long-chain polymer of the fishing lure composition may be selected from, for example, amorphophallus konjac, polyvinyl alcohol (PVA), and the like. The amount of long-chain polymer will generally be from about 1 wt % to about 24 wt % of the total composition. The preferred long-chain polymer is PVA, and a preferred PVA has the following structure, where x is from about 2000 to about 3000.

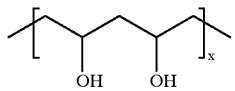

The PVA will preferably be 99% hydrolyzed, with a DP of 2,700 to 2,800.

Konjac may be used in combination with PVA and when so used, the konjac is present in an amount of from 0.1 wt % to 4.0 wt % of the composition. Preferably, the amorphophallus konjac consists of mannose and glucose in a molar ratio of 1.6:1, respectively, with beta 1–4 linkage.

The biodegradable polymeric gum for use in the fishing lure compositions of the present invention may be selected from, for example, iota carrageenan gum, xanthan gum, arabinogalactans, and the like.

It has been found that in using the above polymers and gums, while many of the desired characteristics of an acceptable fishing lure were achieved, the compositions were found to be lacking in cohesive strength when the lures are large or heavy. While small or lightweight lures were acceptable, large/heavy lures molded from the above polymers and gums, alone or in admixture, would not stay on a hook, would slip down or off the hook, or would fracture and break after several hard casts while being fished.

In accordance with the present invention, these shortcomings in large or heavy fish lures are overcome by subjecting the lures after molding to freezing temperatures for various time intervals. This freezing step results in lures having sufficient cohesive strength to remain on a hook, even after many casts. Without being bound by theory, it is believed that this increase in cohesive strength is due to hydrogen bonding catalyzed by freezing.

The freezing temperatures (at 35° F. or 0° C., and below) cause hydrogen bonding to take place. After hydrogen bonding has taken place in accordance with the present invention, the lures increase their cohesive strength and retain other physical properties up to temperatures of about 150° F. However, above this temperature, the lures begin to soften and become very soft and then change to a liquid at temperatures of about 180–190° F. The hydrogels of the invention are heat- and cold-reversible, so that the hydrogen bonding can be reinitiated by refreezing the lure.

However, we have found in testing for shelf life of the lures that successive freeze/thaw cycles create lures that continue to get harder and stiffer. This hardness-stiffness eventually draws the molecules so tight that syneresis of liquids occurs and the fish lure becomes unacceptable; that is, increased hydrogen bonding initiates severe syneresis (weeping), which changes the physical properties of the lures unacceptably.

It has now been found that a biodegradable polymeric gum, when included with the long-chain polymers, either stops or impedes the hardening (curing) process of the fish lures after two to three or five freeze/thaw cycles. Without being bound by theory, it is thought that this occurs due to a lattice structure formed by the gums, which prevents the longer polymer molecules from retracting and coiling. This retracting and coiling phenomenon is believed to not only affect the hardness of the final lure but also to cause syneresis (weeping) to take place by squeezing out the water in an increasing amount in successive freeze/thaws. The long-chain polymer molecules are required for strength but must be balanced with the gums that form a lattice structure. The most desirable ratio or balance of long-chain polymer(s) to gum(s) is easily determined by one of ordinary skill in the art by routine experimentation. Generally, the gum will be present in the composition in an amount of from 0 wt % to about 10 wt %, based on the particular gum chosen. Thus, for example, iota carrageenan will generally comprise from 0 wt % to about 10 wt %; xanthan, generally from 0 wt % to about 2 wt %; and arabinogalactan, generally from 0 wt % to about 1.5 wt %. These gums may be used individually or two or more may be included in the composition, the total amount of all gums in the composition being generally from 0 wt % to about 10 wt %.

If the polymer concentrations are reduced to the point where the lure is acceptable when the curing process reaches an end point, the lure requires excessively long freeze-cure cycles of up to days. It has now been found that by using an aromatic hydroxyl compound as an accelerator, the curing process (hydrogen bonding) is accelerated when the lures are subjected to freezing temperatures. The cure time can be reduced from several days to less than one minute. This allows for adjustments on the amounts of polymers to allow complete cures while retaining the other desirable physical properties, to give an acceptable fish lure. Examples of accelerators useful in the present invention include, but are not limited to, catechol, nordihydroguaiaretic acid, hydroquinone, anthraquinone, resorcinol, gallic acid, pyrogallol, phloroglucinol, propyl gallate, glutaric acid, and the like. The accelerator, when present in the formulation, is generally in an amount of from about 0.1 wt % to about 2.0 wt % of the total composition.

A particularly desirable characteristic of the fish lures of the present invention is their ability to release attractants efficiently and effectively into the water environment. Thus, attractants may optionally be, and preferably are included in the fishing lure composition of the invention. Chemicals that will attract fish are well known in the art and include, but are not limited to, Berkley's fish attractants; garlic oil; menhaden products, such as menhaden fish solubles, menhaden hydrolyzed fish solubles, and menhaden oil; and the like. When included in the composition, the attractants are generally present in an amount of from about 1 wt % to about 30 wt %, preferably from about 5 wt % to 25 wt % of the total composition.

Plasticizers may be added to the polymeric composition of the invention to facilitate processing and to increase the flexibility and toughness of the final fishing lure. Plasticizers and their use are well known in the art and may be chosen without undue experimentation. Plasticizers that may be used include, but are not limited to, sorbitol, glycerin, propylene glycol, n-methyl pyrrolidone, and the like. They are present in the composition in an amount of from 0 wt % to about 15 wt %, preferably from about 1 wt % to about 10 wt %.

Water is generally present in the composition of the invention in an amount of more than 50 wt % of the total composition, more generally in the range of from about 63 wt % to about 93 wt %.

In preparing the fishing lures of the invention, the long-chain polymer and any additional components of the composition, other than the gum, are stirred at high temperature (usually approximately 190–200° F.) until the polymer is in complete solution. With high shear agitation, the gum, if included in the target composition, is added. High shear agitation is continued until the gum is completely hydrated, giving a high-viscosity, pseudoplastic mix. When the gum is completely hydrated, the temperature of the mixture is maintained while the mixture is injected into hot molds, which are then allowed to cool to room temperature. Alternatively, after hydration, the mixture may be cooled and stored at room temperature, and at a later time is then reheated and injected into heated molds. If the resultant molded lures are small and light-weight (e.g., catfish or crappie baits or lures), the lure is then ejected from the mold. The mold will retain its shape at room temperature.

When the fish lures are to be heavy (2 ounces or more) or long (2 inches or more), the molded lure must be subjected to freezing temperatures in order to effect hydrogen bonding to produce the necessary physical properties required of a long or heavy lure. In general, the molded lures are cured by chilling at from about −70° F. to about 25° F. for a period of about 2 minutes to about 24 hours to achieve the desired hydrogen bonding, after which the molds are returned to room temperature (one freeze/thaw cycle). After one freeze/thaw cycle, the fish lure product will fall within the acceptable specifications for the desired product. However, although successive freeze/thaw cycles are not necessary, they may be encountered during the life of the product (e.g., in warehouses, ice fishing, in the trunk of an automobile, and the like). it has been found that successive freeze/thaw cycles do not negatively affect the lures.

The following examples illustrate the practice of the present invention. Parts are given as percentages and temperature in degrees Fahrenheit unless otherwise noted. "RT" is room temperature.

EXAMPLES

Example 1

A composition of the following formulation was prepared:

| Component | Amount (wt %) |
| --- | --- |
| Distilled water | 63.7 |
| Polyvinyl alcohol (Vinol 125) | 2.0 |
| Propylene glycol | 10.0 |
| Fish attractant | 10.0 |
| Potassium chloride | 0.3 |
| Distilled water | 10.0 |
| amorphophallus konjac (Konjac XP3231) | 2.0 |
| iota carrageenan (Gelcarin 379) | 1.0 |
| xanthan (Keltrol) | 1.0 |

Manufacturing procedure: The mixing vessel was charged with the first aliquot of water, the propylene glycol, Vinol 125, and the attractant. The mixing vessel must have the capability of heating the mixture to 190–200° and of producing good shear and moving the entire batch of a high viscosity, pseudoplastic mix. It would be desirable to have a closed vessel with a reflux condenser in order to maintain the correct amounts of water. The mixture is heated to 190–200° and mixed until the Vinol is in complete solution. While mixing vigorously, the preblended mixture of Konjac and Gelcarin and Keltrol gums were added. Heat and high shear agitation were maintained until the gums were completely hydrated. A solution of the potassium chloride in the second aliquot of water were added to the batch while continuing the high shear agitation until the mixture was completely homogeneous. While maintaining the temperature at 190–200°, the mixture was shot into hot (180–200°) molds.

Fish lures made by this example will retain a shape when demolded at room temperature. This formula is acceptable without freezing for small and light-weight lures that do not involve repeated hard casting. However, it will not develop sufficient physical properties to function as a long or heavy fishing lure.

Example 2

A composition of the following formulation was prepared:

| Component | Amount (wt %) |
| --- | --- |
| Distilled water | 80.7 |
| Polyvinyl alcohol (Vinol 165) | 5.0 |
| iota carrageenan (Gelcarin 379) | 4.0 |
| Attractant | 10.0 |

Manufacturing procedure: All ingredients exclusive of the carrageenan were added to a mixing vessel and heated to 200° until the PVA was in complete solution. With high shear agitation, the carrageenan was added to the mixing vessel; high shear agitation was continued until the carrageenan was completely hydrated. The temperature of the composition was maintained as the composition was injected into hot molds. The molds were then cooled to RT and the molded parts were ejected.

While the formula of this example will set up at RT, proper physical properties for large or heavy lures will not develop. In order to obtain the proper physical properties, the molded lures of this formulation were exposed to freezing temperature (25°) for a minimum of one hour.

Example 3

A composition of the following formulation was prepared:

| Component | Amount (wt %) |
| --- | --- |
| Distilled water | 74.8 |
| Polyvinyl alcohol (Vinol 165) | 9.6 |
| Glycerin | 4.0 |
| Fish attractant | 10.0 |
| amorphophallus konjac (Konjac XP-3231) | 0.8 |
| xanthan (HP) | 0.8 |

Manufacturing procedure: The mixing vessel was charged with the water and glycerin. While the water and glycerin are cold and being agitated, the PVA was added. The temperature of the vessel was heated to 190–200°. Mixing at a low level was continued until the PVA was completely in solution. The konjac and the xanthan were preblended as dry powders and then added to the batch while using high shear agitation, continuing agitation and heating until the gums have completely hydrated. The attractant was added while continuing the high shear agitation. The mixture is agitated until the batch is homogeneous.

This formulation may be cooled and stored at room temperature before injecting into 25° molds for freeze cure treatment.

This formulation will not set up at 50°, nor will it retain any desirable physical properties without freezing. This formulation when left at room temperature never gains sufficient strength to hold the shape of the molded lure.

The molded lures were chilled at from about −70° to about 25° for a period of from about 2 minutes to about 24 hours to achieve the desired hydrogen bonding. Strength, softness, flexibility, durability, coefficient of friction, and heat stability are imparted by the freeze treatment.

Example 4

Tensile strength as it relates to the amount of time the molded lure is subjected to freezing temperatures and allowed to return to room temperature was tested as follows.

Method of Testing:
1. The composition of Example 3 was molded in the shape of worms, which were 4.3 inches long including the tail. Head to start of the tail was 3.3 inches long, tapered. The head was 0.28 inches and the end of the body was 0.18 inches in diameter. Tails were 1×0.25×0.05 inches.
2. The section of the largest part of the worm's tail is placed in the grippers of an Ametek Force Gage.
3. The end of the worm is grasped with a hand and pulled with steady pressure until the worm breaks.
4. Read the Force Gage at its highest reading before the break.

Results of the Tests:

| Time Frozen at 20° F. | Force Gage reading at break |
| --- | --- |
| 1 hr, 15 min | 0.51 lb. |
| 3 hr | 0.62 lb. |
| 5 hr | 0.89 lb. |
| 6 hr | 1.30 lb. |
| 11 hr | 1.24 lb. |
| RT for 7 days | no reading (did not set up) |

Example 5

The tensile strengths of a lure of the present invention and a PVC lure were tested, following the procedure of Example 4. The worm of the invention was made from the formulation of Example 3 and was frozen for 6 hours, after which it was allowed to return to room temperature. The PVC worm was cast from the same mold as the Example 3 worm, using a commercial PVC formula. The PVC worm was not frozen.

Three worms of each formulation were tested. The average tensile strength of the Ex. 3 worms was 1.30 lb. The average tensile strength of the PVC worms was 1.28 lb.

Example 6

The formulation of the present invention was tested for toughness, by the following procedure.

Method of Testing:
1. Worms, cast from the same molds as in Example 4, were formed from the formulation of Example 3 and frozen for specified times, then allowed to return to RT.
2. A hook is placed in the grippers of an Ametek Force Gage.
3. The largest part of the worm is placed through the bend in the hook.
4. Grasp each end of the worm with hands and pull against the hook until the worm breaks.
5. Read the Force Gage at its highest reading before the break.

Results of the Tests (averaged from 3 worms each):

| Time Frozen at 20° F. | Force Gage reading at break |
| --- | --- |
| 1 hr, 15 min | 1.57 lb. |
| 3 hr | 3.99 lb. |
| 5 hr | 2.19 lb. |
| 6 hr | 4.26 lb. |
| 11 hr | 4.19 lb. |

Example 7

The toughness of a lure of the present invention and a PVC lure were tested, following the procedure of Example 6. The worm of the invention was made from the formulation of Example 3 and was frozen for 6 hours, after which it was allowed to return to room temperature. The PVC worm was cast from the same mold as the Ex. 3 worm, using a commercial PVC formula. The PVC worm was not frozen.

Three worms of each formulation were tested. The average toughness of the Ex. 3 worms was 4.13 lb. The average toughness of the PVC worms was 4.26 lb.

Example 8

The lubricity and draft coefficient of friction were tested as follows:

Method of testing: PVC worms and worms made as in Example 3 (frozen 6 hours), molded in identical molds, were used in this test. The same rod, reel, line, and hook rigged with a popular method (Texas Rig) were used for the entire test. Three worms of each formulation were cast five times each. Care was taken to make sure each cast was as identical as possible. The worms were cast in water that was covered with moss and algae.

Results: In every cast, the PVC worms collected moss at the head of the rig as it was retrieved. In every cast with the worm of Ex. 3, the worm slipped through the moss without collecting any of the moss.

Example 9

The rate of release of an additive (such as, for example, a fish attractant) was tested, following the below method.

Method of Testing:
1. Worms were molded from identical molds. PVC worms were from a commercial formula with a fish attractant. The attractant has a brown color. Worms according to this invention and with the same attractant as the PVC worms were made according to Examples 1, 2, and 3 (subjected to 6 hours of freezing temperatures of 15–20°).
2. Eight clear glass containers were filled with 800 mL of water each.
3. In replicates of two, a worm was placed in each glass container and visual observations were made at 0 minutes, 30 minutes, 60 minutes, 2 hours, and 12 hours.

Results: There was no obvious change in the PVC worms or the color of the water at 0 minutes or for the duration of the 12-hour test. Example 1, 2 and 3 worms showed no obvious change at zero minutes but progressively lost brown color over time and the water progressively became brown in color for the duration of the 12-hour test, indicating release of the attractant from the worms.

The raw material cost of the formulations of Examples 1, 2 and 3 offers a substantial cost savings over that of PVC compositions; i.e., water is substantially cheaper than hydrocarbon plasticizers or oil extenders, which are required for the PVC formulation and not for that of the present invention.

Example 10

The process of Example 3 was repeated but using garlic oil (25% concentration) in the Example 3 formulation as the attractant. This lure is very good for bottom fishing.

Example 11

A composition of the following formulation was prepared:

| Component | Amount (wt %) |
|---|---|
| Distilled water | 80.0 |
| Polyvinyl alcohol (Airvol 165) | 4.0 |
| Glycerin | 4.0 |
| Attractant | 10.0 |
| carrageenan (Gelcarin GP379) | 2.0 |

This formulation was prepared as in the previous Examples and then poured at 190° into molds, cured at 0° overnight, and thawed to RT. The Shore 00 durometer reading was 0 and the product was dry. The product remained at the durometer reading of 0 and dry for eight successive freeze/thaw cycles.

When the formulation was continually stirred after compounding until it reached RT and then poured into molds and cured, the initial durometer reading was 0. However, in sequence freeze/thaw cycles, the durometer reading increased until it reached 15–16 after six successive freeze/thaw cycles.

Example 12

A composition of the following formulation was prepared:

| Component | Amount (wt %) |
|---|---|
| Distilled water | 66.0 |
| Polyvinyl alcohol (Elvanol 70-06) | 12.0 |
| Polyvinyl alcohol (Airvol 165) | 6.0 |
| M-Pyrol (n-methyl-2-pyrrolidone) | 2.0 |
| Attractant | 10.0 |
| carrageenan (Gelcarin 379) | 2.0 |

This formulation was prepared as in the previous Examples and then poured at 190° into molds, cured at 0° overnight, and thawed to RT. The Shore 00 durometer reading of the lures after one freeze/thaw cycle was 20–25. After three freeze/thaw cycles, the durometer reading reached 30–35 and remained there after five cycles. The product remained dry after the five freeze/thaw cycles.

Example 13

The effects of the number of freeze/thaw cycles to which the lures may be exposed during manufacture were investigated, as follows.

A composition of the following formulation was prepared:

| Component | Amount (wt %) |
|---|---|
| Distilled water | 68.75 |
| Polyvinyl alcohol (Elvanol 75-15) | 12.00 |
| Polyvinyl alcohol (Airvol 165) | 4.00 |
| Berkley Bass Attractant | 15.00 |
| Black Fleck glitter | 0.25 |

Manufacturing procedure: This formulation was prepared as in the previous Examples, cooled to RT and then injected into molds at 25°, ejected and packaged while frozen. The packaged lures were frozen overnight at 0°, and allowed to thaw to RT (a freeze/thaw cycle). One set of lures had only one freeze/thaw cycle (Sample Set 1); a second set was subjected to two cycles (Sample Set 2), a third to three cycles (Sample Set 3), a fourth to four cycles (Sample Set 4), and a fifth to five cycles (Sample Set 5). The final lures were stored at RT, and Shore 00 durometer readings were taken at day 1, day 12 and day 23 following the final freeze/thaw cycle. The results are presented below:

| | Shore Durometer Reading | | |
|---|---|---|---|
| Sample Set | Day 1 | Day 12 | Day 23 |
| 1 | 0 set | 1 | 5 |
| 2 | 5 | 15 | 17 |
| 3 | 13 | 21 | 22 |
| 4 | 17 | 22 | 24 |
| 5 | 19 | 27 | 27 |

At 23 days, the lures undergoing one or two freeze/thaw cycles remained dry, and those subjected to three, four or five cycles had a damp touch but no sufficient syneresis to produce puddling in bags.

Example 14

A comparative fishing test was conducted on worms of the formulation of Example 13 having a durometer reading of 21, with PVC worms having the same level of Berkley Bass Attractant and Black Fleck glitter and molded in an identical mold. Six fishermen fished the lures two successive days. Each fisherman fished with one lure for thirty minutes, then changed to the other lure and fished for thirty minutes, for the duration of the two-day test. The total fish catches for the two days of fishing were 78 with the PVC lures and 102 with the PVA lures of this invention. The PVA formulation out-performed the PVC formulation by 31%, and it won eight head-to-head matches, lost three matches and tied one. This test demonstrates that the lure of this invention is superior to PVC in attracting and catching fish.

Example 15

The following tests demonstrate the acceleration of hydrogen bonding or cure by including an aromatic hydroxyl compound in the formulation.

A composition as in Example 13 was prepared with and without the addition of 1.5% gallic acid as a hydrogen-bonding accelerator. The composition was injected into aluminum molds and frozen at −70° for a specific period of time for each cycle, then allowed to return to RT. Thus, for the first freeze/thaw cycle (Cycle #1), the lures were frozen for 1 minute; for the second cycle (Cycle #2), the lures were frozen for the second time for 1 hour; in Cycle #3, the lures were frozen for the third time for 17 hours; and so forth, as indicated in the table below. Shore 00 durometer readings were taken and the percent of hydrogen-bonding (% cure) was determined after each successive freeze/thaw cycle. The results are presented below:

|  |  | Without Gallic Acid | | With Gallic Acid | |
|---|---|---|---|---|---|
| Freeze/Thaw Cycle # | Amt. Time in Freezer | Durometer Reading | % Cure | Durometer Reading | % Cure |
| 1 | 1 min. | 0 | 0 | 12 | 32.4 |
| 2 | 1 hr. | 0 | 0 | 27 | 72.9 |
| 3 | 17 hr. | 10 | 27.0 | 30 | 81.1 |
| 4 | 1 hr. | 15 | 40.5 | 37 | 100.0 |
| 5 | 1 hr. | 16 | 43.2 | 37 | 100.0 |
| 6 | 17 hr. | 20 | 54.0 | 37 | 100.0 |

The following formula was used to calculate the percent cure:

$$\frac{\text{Durometer Reading}}{\text{Equilibrium End Point}} = \% \text{ Cure}$$

The Equilibrium End Point equals two or more successive durometer readings that are the same after successive freeze/thaw cycles.

The same composition was poured into petri dishes and subjected to five freeze/thaw cycles. In each freeze/thaw cycle, the samples were frozen for either 15 minutes, 30 minutes, or 1 hour at −70°. Shore 00 durometer readings ("D") were taken, and the results are presented below:

|  | Time in Freezer per Cycle | | | | | | | | |
|---|---|---|---|---|---|---|---|---|---|
| Freeze/thaw | 15 min. | | | | 30 min. | | | 1 hour | |
| Cycle # | w/o | % cure | with | % cure | w/o | % cure | with | % cure* | w/o | % cure | with | % cure* |
| 1 | D-0 | 0.0 | D-17 | 49.0 | D-0 | 0.0 | D-22 | 63.0 | D-0 | 0.0 | D-22 | 62.8 |
| 2 | D-0 | 0.0 | D-28 | 80.0 | D-3 | 9.0 | D-28 | 80.0 | D-2 | 6.0 | D-28 | 80.0 |
| 3 | D-10 | 35.0 | D-28 | 80.0 | D-10 | 35.0 | D-29 | 83.0 | D-10 | 35.0 | D-30 | 86.0 |
| 4 | D-15 | 43.0 | D-35 | 100.0 | D-15 | 43.0 | D-36 | 100.0 | D-15 | 43.0 | D-35 | 100.0 |
| 5 | D-16 | 46.0 | D-35 | 100.0 | D-16 | 46.0 | D-35 | 100.0 | D-16 | 46.0 | D-35 | 100.0 |

Example 16

Compositions of the following formulations were prepared (amounts of the components are in wt %):

|  | Formulation # | | | | | |
|---|---|---|---|---|---|---|
| Component | 1 | 2 | 3 | 4 | 5 | 6 |
| Distilled water | 72.75 | 72.25 | 71.75 | 71.25 | 71.25 | 71.75 |
| Polyvinyl alcohol (Elvanol 75-15) | 9.00 | 9.00 | 9.00 | 9.00 | 9.00 | 9.00 |
| Polyvinyl alcohol (Airvol 165) | 3.00 | 3.00 | 3.00 | 3.00 | 3.50 | 3.50 |
| Berkley Bass Attractant | 15.00 | 15.00 | 15.00 | 15.00 | 15.00 | 15.00 |
| Black Fleck glitter | 0.25 | 0.25 | 0.25 | 0.25 | 0.25 | 0.25 |
| Gallic acid | 0.00 | 0.50 | 1.00 | 1.50 | 0.50 | 1.00 |

Each formulation was poured into a petri dish and frozen for 20 minutes at −70°, after which they were allowed to return to RT. Shore 00 durometer readings were:

| Formulation: | 1 | 2 | 3 | 4 | 5 | 6. |
|---|---|---|---|---|---|---|
|  | D-0* | D-0* | D-2 | D-18 | D-0* | D-22 |

*Had not set up properly to hold a shape.

Konjac and Gelcarin are products of the FMC Corporation. Airvol and Vinol are products of Air Products and Chemicals, Inc. Elvanol is a product of DuPont Industrial Polymers.

The compositions of the present invention have many uses or applications in addition to their use in making soft biodegradable fishing lures. Any application where the controlled release of an active agent, such as water-soluble actives, fragrances, volatile actives, attractants, etc., is desired can be accomplished with the compositions of this invention. The components of the compositions of the present invention are innocuous and are frequently found in foods and used in food processing. The compositions can be used in dressings, bandages and/or wraps to release actives to humans or domestic animals. They can be used to release actives in water for several applications.

What is claimed is:

1. A fish lure comprising at least one water-soluble long-chain polyhydroxy polymer with a molecular weight of at least 195,000 and a degree of polymerization of at least 2500, and, optionally, a water-soluble polymeric gum, and wherein the fish lure is biodegradable, can release fish attractant, and has a Shore 00 durometer reading of from 0 to 50.

2. A fish lure according to claim 1 which further comprises a hydrogen-bonding accelerating aromatic hydroxyl compound.

3. A fish lure according to claim 2 which further comprises a fish attractant.

4. A fish lure according to claim 1 which further comprises a fish attractant.

5. A fish lure according to claim 1 wherein the at least one water-soluble polyhydroxy polymer is polyvinyl alcohol and, optionally, amorphophallus konjac.

6. A fish lure according to claim 5 wherein the water-soluble polymeric gum is selected from the group consisting of iota carrageenan gum and xanthan gum.

7. A fish lure according to claim 6 which further comprises a hydrogen-bonding accelerating aromatic hydroxyl compound selected from the group consisting of catechol, nordihydroguaiaretic acid, hydroquinone, anthraquinone, resorcinol, gallic acid, pyrogallol, phloroglucinol, propyl gallate, and glutaric acid.

8. A fish lure according to claim 7 which further comprises a fish attractant.

9. A fish lure which comprises a blend of at least one water-soluble long-chain polyhydroxy polymer with a molecular weight of at least 195,000 and a degree of polymerization of at least 2500, and, optionally, a water-soluble polymeric gum, said blend having been subjected to at least one freeze/thaw cycle after formation of the fish lure to give a fish lure that is biodegradable, can release fish attractant, and has a Shore 00 durometer reading of from 0 to 50.

10. A fish lure according to claim 9 wherein the blend further comprises a hydrogen-bonding accelerating aromatic hydroxyl compound.

11. A fish lure according to claim 10 wherein the blend further comprises a fish attractant.

12. A fish lure which comprises a blend of:
   about 1 wt % to about 24 wt % of polyvinyl alcohol with a molecular weight of at least 195,000 and a degree of polymerization of at least 2500,
   0 wt % to about 4 wt % of amorphophallus konjac,
   0 wt % to about 10 wt % of a water-soluble polymeric gum,
   about 0.1 wt % to about 2 wt % of a hydrogen-bonding accelerating aromatic hydroxyl compound,
   about 1 wt % to about 30 wt % of a fish attractant,
   about 1 wt % to about 15 wt % of a plasticizer, and
   about 63 wt % to about 93 wt % of water;
wherein the fish lure is biodegradable, can release fish attractant, and has a Shore 00 durometer reading of from 0 to 50.

13. A fish lure according to claim 12 wherein 10–35% of the polyvinyl alcohol is 99–100% hydrolyzed and has a degree of polymerization of 2,700–2,800.

14. A fish lure according to claim 12 wherein the amorphophallus konjac consists of mannose and glucose in a molar ratio of 1.6:1, respectively, with beta 1–4 linkage.

15. A fish lure according to claim 12 wherein the water-soluble polymeric gum is selected from the group consisting of iota carrageenan gum and xanthan gum.

16. A fish lure according to claim 12 wherein the hydrogen-bonding accelerating aromatic hydroxyl compound is selected from the group consisting of catechol, nordihydroguaiaretic acid, hydroquinone, anthraquinone, resorcinol, gallic acid, pyrogallol, phloroglucinol, propyl gallate, and glutaric acid.

17. A fish lure according to claim 12 wherein the fish attractant is selected from the group consisting of Berkley's fish attractants, garlic oil, menhaden fish solubles, menhaden hydrolyzed fish solubles, and menhaden oil.

18. A fish lure according to claim 12 wherein the blend has been subjected to at least one freeze/thaw cycle after formation of the fish lure.

* * * * *